(12) United States Patent
Beckett et al.

(10) Patent No.: US 7,093,033 B2
(45) Date of Patent: Aug. 15, 2006

(54) INTEGRATED CIRCUIT CAPABLE OF COMMUNICATING USING DIFFERENT COMMUNICATION PROTOCOLS

(75) Inventors: Richard C. Beckett, Phoenix, AZ (US); Robert L. Sheffield, Jr., Chandler, AZ (US); Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 10/442,705

(22) Filed: May 20, 2003

(65) Prior Publication Data

US 2005/0015532 A1    Jan. 20, 2005

(51) Int. Cl.
*G06F 13/00* (2006.01)

(52) U.S. Cl. .............. 710/11; 710/14; 710/15; 711/170; 709/230

(58) Field of Classification Search .......... 710/11, 710/14, 74, 106–107, 200, 260, 8–19, 62; 455/582.1, 552; 711/170–173, 202, 209, 711/114; 709/223–225, 230–237
See application file for complete search history.

(56) References Cited

U.S. PATENT DOCUMENTS

| | | | |
|---|---|---|---|
| 5,257,391 A | 10/1993 | DuLac et al. | |
| 5,509,121 A | 4/1996 | Nakata et al. | |
| 5,841,985 A | 11/1998 | Jie et al. | |
| 5,884,044 A | 3/1999 | Marsanne et al. | |
| 5,946,634 A * | 8/1999 | Korpela ............. | 455/552.1 |
| 6,038,400 A | 3/2000 | Bell et al. | |
| 6,072,803 A | 6/2000 | Allmond et al. | |
| 6,115,771 A | 9/2000 | Born | |
| 6,189,052 B1 | 2/2001 | Nilsson et al. | |
| 6,246,271 B1 | 6/2001 | Takada et al. | |
| 6,246,671 B1 | 6/2001 | Lattanzi et al. | |
| 6,253,268 B1 * | 6/2001 | Bjorkengren et al. ....... | 710/105 |
| 6,334,160 B1 | 12/2001 | Emmert et al. | |
| 6,438,678 B1 | 8/2002 | Cashman et al. | |
| 6,504,851 B1 | 1/2003 | Abler et al. | |
| 6,633,933 B1 * | 10/2003 | Smith et al. ............... | 710/74 |
| 6,643,654 B1 | 11/2003 | Patel et al. | |
| 6,690,655 B1 | 2/2004 | Miner et al. | |
| 6,721,872 B1 | 4/2004 | Dunlop et al. | |

(Continued)

FOREIGN PATENT DOCUMENTS

DE    19616753 A1    12/1996

(Continued)

OTHER PUBLICATIONS

PCT International Search Report, International Application No. PCT/US03/34803, Completed: Mar. 31, 2004, 4 pages.

(Continued)

*Primary Examiner*—Christopher Shin
(74) *Attorney, Agent, or Firm*—Blakely, Sokoloff, Taylor & Zafman LLP

(57) ABSTRACT

A method according to one embodiment may include discovering, at least in part, by an integrated circuit of at least one communication protocol via which at least one device external to the integrated circuit is capable of communicating. In this embodiment, the integrated circuit may be capable of communicating in accordance with a plurality of different communication protocols. The method according to this embodiment may also include selecting, at least in part, by the integrated circuit of the at least one communication protocol to use to communicate with the at least one device. Of course, many alternatives, variations, and modifications are possible without departing from this embodiment.

29 Claims, 4 Drawing Sheets

U.S. PATENT DOCUMENTS

| | | |
|---|---|---|
| 6,748,488 B1 | 6/2004 | Byrd et al. |
| 6,871,244 B1 * | 3/2005 | Cahill et al. ................ 710/62 |
| 2003/0074515 A1 | 4/2003 | Resnick |
| 2003/0093598 A1 | 5/2003 | Park |
| 2003/0219033 A1 | 11/2003 | Silvester |
| 2003/0229739 A1 * | 12/2003 | Brewer et al. ............. 710/105 |
| 2003/0229748 A1 * | 12/2003 | Brewer et al. ............. 710/305 |
| 2004/0015762 A1 | 1/2004 | Klotz et al. |
| 2004/0024858 A1 | 2/2004 | Garcelon et al. |
| 2004/0098518 A1 * | 5/2004 | Beckett et al. ............... 710/14 |
| 2004/0098530 A1 * | 5/2004 | Earl et al. ................... 710/315 |
| 2004/0098645 A1 | 5/2004 | Beckett et al. |
| 2004/0204029 A1 * | 10/2004 | Parry ....................... 455/552.1 |
| 2005/0015532 A1 * | 1/2005 | Beckett et al. ............. 710/105 |
| 2005/0149793 A1 | 7/2005 | Beckett et al. |

FOREIGN PATENT DOCUMENTS

| | | |
|---|---|---|
| DE | 19616753 | 12/1998 |
| DE | 10056198 | 2/2002 |
| DE | 10056198 A1 | 2/2002 |
| EP | 0508604 | 3/1992 |
| EP | 0508604 A2 | 11/1992 |
| WO | WO 01/25942 A1 | 4/2001 |
| WO | WO0125942 | 4/2001 |
| WO | WO 2004/046913 A2 | 6/2004 |
| WO | WO2004046913 | 6/2004 |

OTHER PUBLICATIONS

Intel Corporation Product Brief, 2 pages.

Intel Corp, Intel Network Infrastructure Processors, Extending Intelligence in teh Network.

Alan Brenner—Fibre Channel Gigabit Communications and I/O for Computer Networks—1996 Chapters 6, 7, 8, 12, and 17.

Intel Corp., AAU Support LIbrary for the Intel 80310 I/O Processor Chipset and 80321 I/O Processor, Reference Manual, Apr. 2002.

Intel Corp., Intel XScale Microarchitecture, Technical Summary, 2000.

J. Postel et al., Internet Control Message Protocol, DARPA Internet Program Protocol Specification, Sep. 1981, 19 pages.

Internet Protocol, DARPA Internet Program Protocol Specification, Information Sciences Institute, Univ. of Southern California, Sep. 1981, 45 pages.

R. Elliot et al., Serial Attached SCSI, Proposed Serial Attached SCSI Working draft, Apr. 25, 2002.

KP Deyring et al., Serial ATA: High Speed Serialized AT attachment, Revision 1.0, Aug. 29, 2001.

Intel Corporation, Intel XScale Core, Developer's Manual, Dec. 2000.

PCT Search Report Dated Feb. 11, 2005.

* cited by examiner

INTEGRATED CIRCUIT CAPABLE OF COMMUNICATING USING DIFFERENT COMMUNICATION PROTOCOLS

CROSS-REFERENCE TO RELATED APPLICATION

The subject application is related to co-pending U.S. patent application Ser. No. 10/301,028, entitled "Integrated Circuit Having Multiple Modes Of Operation," filed on Nov. 20, 2002.

The subject application is also related to co-pending U.S. patent application Ser. No. 10/301,027, entitled "Integrated Circuit Having Multiple Modes Of Operation," filed on Nov. 20, 2002.

FIELD

This disclosure relates to an integrated circuit that is capable of communicating using different communication protocols.

BACKGROUND

In one conventional data storage arrangement, a computer node includes a host bus adapter (HBA). The HBA communicates with a data storage system via one or more communication links using a communication protocol associated with the one or more links. Typically, the HBA includes a plurality of integrated circuit chips to carry out communications between the HBA and the data storage system, and is capable of using only a single predetermined communication protocol to communicate with the data storage system. Thus, for example, in this conventional arrangement, if the data storage system is incapable of communicating with the HBA using this predetermined protocol, one or more external communication protocol converters, translators, and/or expanders may be coupled between the HBA and data storage system to permit communication between the HBA and data storage system.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
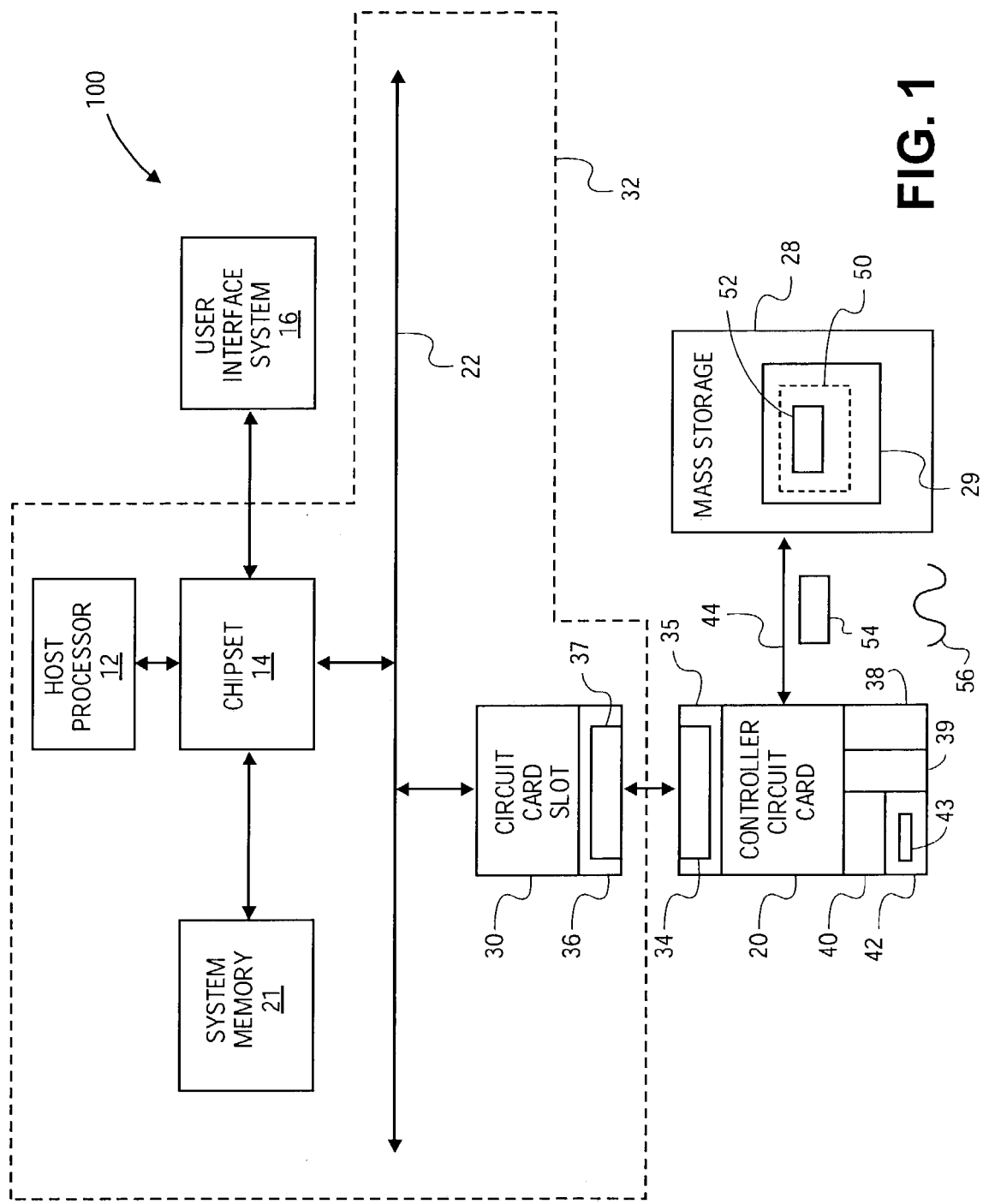
FIG. 1 is a diagram illustrating a system embodiment.

FIG. 1 illustrates a system embodiment 100 of the claimed subject matter. System 100 may include a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, a system memory 21 and a user interface system 16 to each other and to a bus system 22. Chipset 14 may also include an input/output (I/O) bridge/hub system (not shown) that may couple the host bridge/bus system to bus 22. Chipset 14 may comprise integrated circuit chips, such as those selected from integrated circuit chipsets commercially available from the assignee of the subject application (e.g., graphics memory and I/O controller hub chipsets), although other integrated circuit chips may also, or alternatively be used, without departing from this embodiment. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, without departing from this embodiment.

Controller card 20 may be coupled to and control the operation of mass storage 28. In this embodiment, mass storage 28 may comprise, e.g., one or more redundant arrays of independent disks (RAID) 29. The RAID level that may be implemented by RAID 29 may be 0, 1, or greater than 1. RAID 29 may comprise, for example, one or more disk mass storage devices and/or one or more peripheral devices (collectively or singly shown in FIG. 1 by the block referred to by numeral 52) comprised in a protocol domain 50. As used herein, a "protocol domain" means one or more apparatus that may communicate in accordance with a communication protocol.

Processor 12, system memory 21, chipset 14, bus 22, and circuit card slot 30 may be comprised in a single circuit board, such as, for example, a system motherboard 32. Mass storage 28 may be comprised in one or more respective enclosures that may be separate from the enclosure in which the motherboard 32 and the components comprised in the motherboard 32 are enclosed.

Card 20 may be coupled to mass storage 28 via one or more network communication links 44. As is discussed below, card 20 may exchange data and/or commands with mass storage 28, via links 44, using, e.g., Serial Advanced Technology Attachment (S-ATA) protocol and/or Serial Attached Small Computer Systems Interface (SAS) protocol. Of course, alternatively, I/O controller card 20 may exchange data and/or commands with mass storage 28 using other and/or additional communication protocols, without departing from this embodiment.

In accordance with this embodiment, if an S-ATA protocol is used by controller card 20 to exchange data and/or commands with mass storage 28, it may comply or be compatible with the protocol described in "Serial ATA: High Speed Serialized AT Attachment," Revision 1.0, published on Aug. 29, 2001 by the Serial ATA Working Group. Further alternatively, if an SAS protocol is used by controller card 20 to exchange data and/or commands with mass storage 28, it may comply or be compatible with the protocol described in "Information Technology—Serial Attached SCSI (SAS)," Working Draft American National Standard of International Committee For information Technology Standards (IN-CITS) T10 Technical Committee, Project T10/1562-D, Revision 2b, published 19 Oct. 2002, by American National Standards Institute (hereinafter termed the "SAS Standard") and/or later-published versions of the SAS Standard.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37 may be electrically and mechanically mated with a mating bus connector 34 that may be comprised in a bus expansion slot or interface 35 in circuit card 20.

Circuit card 20 may comprise an integrated circuit 40, operating mode selector circuitry 42, computer-readable boot code memory 39, and computer-readable memory 38. Alternatively, although not shown in the Figures, integrated circuit 40 may comprise memory 38 and/or memory 39. As used herein, an "integrated circuit" means a semiconductor device and/or microelectronic device, such as, for example, a semiconductor integrated circuit chip. Memories 38 and/or 39 each may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memories 38 and/or 39 each may comprise other and/or later-developed types of computer-readable memory.

Machine-readable firmware program instructions may be stored in memory 38. As described below, these instructions may be accessed and executed by integrated circuit 40. When executed by integrated circuit 40, these instructions may result in integrated circuit 40 performing the operations described herein as being performed by integrated circuit 40.

Slot 30 and card 20 are constructed to permit card 20 to be inserted into slot 30. When card 20 is properly inserted into slot 30, connectors 34 and 36 become electrically and mechanically coupled to each other. When connectors 34 and 36 are so coupled to each other, card 20 becomes electrically coupled to bus 22 and may exchange data and/or commands with system memory 21, host processor 12, and/or user interface system 16 via bus 22 and chipset 14.

Alternatively, without departing from this embodiment, the operative circuitry of card 20 may not be comprised in card 20, but instead, may be comprised in other structures, systems, and/or devices. These other structures, systems, and/or devices may be, for example, comprised in motherboard 32, coupled to bus 22, and exchange data and/or commands with other components (such as, for example, system memory 21, host processor 12, and/or user interface system 16) in system 100.

Figure 2:
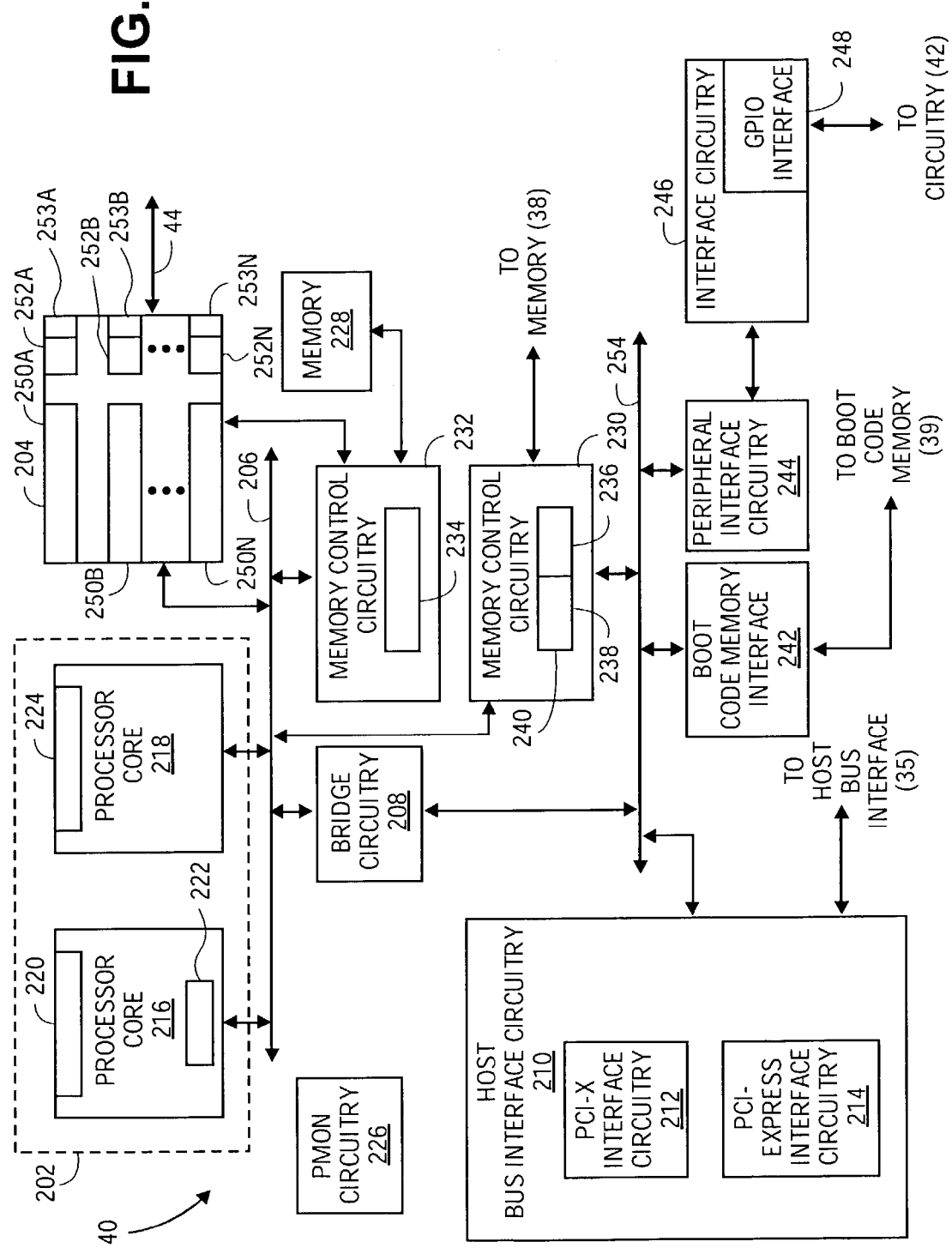
FIG. 2 is a diagram illustrating in greater detail an integrated circuit in the system embodiment of FIG. 1.

FIG. 2 is a diagram of integrated circuit 40. In this embodiment, integrated circuit 40 may comprise processor circuitry 202, I/O interface circuitry 204, memory control circuitry 232, memory control circuitry 230, processor bus 206, and bus bridge circuitry 208. Processor circuitry 202, I/O interface circuitry 204, memory control circuitry 232, memory control circuitry 230, and bus bridge circuitry 208 may be coupled to, and exchange data and/or commands via, bus 206. Bus bridge circuitry 208 may couple processor bus 206 to I/O bus 254, and may permit devices that may be coupled to bus 206 to exchange data and/or commands with devices that may be coupled to bus 254, while permitting the respective address spaces of buses 206 and 254 to be isolated from each other. Memory control circuitry 230, host bus interface circuitry 210, boot code memory interface 242, and peripheral interface circuitry 244 also may be coupled to bus 254, and may exchange data and/or commands among each other via bus 254. Memory control circuitry 230 may be coupled to memory 38. Boot code memory interface 242 may be coupled to memory 39. Memory control circuitry 232 may be coupled to computer-readable memory 228. Memory 228 may comprise, for example, multi-port static random access memory (SRAM), although memory 228 may comprise other types of computer-readable memory without departing from this embodiment. Host bus interface circuitry 210 may be coupled host bus interface 35.

Mode selector circuitry 42 may be coupled to general purpose I/O interface circuitry 248 that may be comprised in interface circuitry 246. Interface circuitry 246 may comprise other and/or additional types of interface circuitry (not shown) without departing from this embodiment. The interface circuitry comprised in interface 246 may be coupled together via, for example, a peripheral bus (not shown). Interface 246 may be coupled to bus 254 via peripheral interface circuitry 244 that may permit the interface circuitry in circuitry 246 that may be coupled to the peripheral bus in circuitry 246 to exchange data and/or commands with devices that may be coupled to bus 254.

Boot code memory interface circuitry 242 may permit program instructions stored in memory 39 to be retrieved therefrom and executed by processor circuitry 202, after, for example, a reset of integrated circuit 40. More specifically, processor circuitry 202 may provide one or more commands to memory 39 and/or interface circuitry 242, via bus 206, bridge circuitry 208, bus 254, and interface circuitry 242, that may result such program instructions being retrieved from memory 39 and provided to circuitry 202, via interface 242, bus 254, bridge circuitry 208, and bus 206.

Integrated circuit 40 also may comprise performance monitoring (PMON) circuitry 226. PMON circuitry 226 may monitor, e.g., exchange of data and/or commands carried out via bus 206 and/or bus 254, and/or other and/or additional operations carried out by other circuitry in integrated circuit 40, and may determine, based at least in part upon such monitoring, whether integrated circuit 40 is operating properly. PMON circuitry 226 may indicate the results of its monitor activities to, e.g., processor circuitry 202 and/or external devices, such as, for example, host processor 12 via circuitry 210.

Processor circuitry 202 may include processor core circuitry that may comprise a plurality of processor cores 216 and 218. As used herein, a "processor core" may comprise hardwired circuitry, programmable circuitry, and/or state machine circuitry. Also, as used herein, "circuitry" may comprise, for example, singly or in any combination, hardwired circuitry, programmable circuitry, state machine circuitry, and/or firmware that stores instructions executed by programmable circuitry. In this embodiment, each processor core 216 and 218 may comprise respective circuitry that may be compatible and/or in compliance with the Intel® XScale™ Core micro-architecture described in "Intel® XScale™ Core Developers Manual," published December 2000 by the Assignee of the subject application. Of course, as stated above, circuitry 202 may comprise other types of processor core circuitry without departing from this embodiment.

In this embodiment, processor cores 216 and 218 may comprise, for example, computer-readable program instruction memory 220 and 224, respectively, that may contain respective sets of micro-code program instructions that processor cores 216 and 218, respectively, may execute. The execution of these respective sets of program instructions by processor cores 216 and 218, respectively, may result in, for example, the carrying out by circuitry 202, core 216, and/or core 218 of operations described herein as being carried out by circuitry 202, core 216, and/or core 218, respectively. At least a portion of these respective sets of program instructions may be retrieved from, e.g., boot code memory 39 after, for example, a reset of integrated circuit 40. Processor core 216 also may comprise a level-2 cache memory 222 that may be used by processor core 216 in carrying out the operations described herein as being carried out by processor core 216.

Interface circuitry 204 may comprise protocol engine circuitry 250A, 250B, . . . 250N and physical layer interface circuitry 252A, 252B, . . . 252N. As described below, each respective protocol engine circuitry 250A, 250B, . . . 250N may be associated with, and exchange data and/or commands with respective physical layer interface circuitry 252A, 252B, . . . 252N. Thus, for example, protocol engine circuitry 250A may be associated with, and exchange data and/or commands with physical layer interface circuitry 252A, protocol engine circuitry 250B may be associated with, and exchange data and/or commands with physical layer interface circuitry 252B, and protocol engine circuitry 250A may be associated with, and exchange data and/or commands with physical layer interface circuitry 252N, respectively. In this embodiment, the respective construction and operation of each of the protocol engine circuitry 250A, 250B, . . . 250N may be respectively identical. Additionally, in this embodiment, the respective construction and operation of each of the interfaces 252A, 252B, . . . 252N may be respectively identical.

Without departing from this embodiment, the respective numbers of protocol engines 252A, 252B, . . . 252N, physical layer interfaces 252A, 252B, . . . 252N, and links 44 may vary. However, in this embodiment, the number of protocol engines 250A, 250B, . . . 250N may be equal to the number of physical layer interfaces 252A, 252B, . . . 252N. Also in this embodiment, each of the physical layer interfaces 252A, 252B, . . . 252N may be coupled to a respective one of the links 44; therefore, in this embodiment, the number of physical layers interfaces 252A, 252B, . . . 252N may be equal to the number of links 44.

Host bus interface circuitry 210 may comprise respective interface circuitry that may be used to permit integrated circuit 40 to be able to exchange, in accordance with one of a plurality of different host bus protocols with which bus 22 may comply or be compatible, data and/or commands with other devices that may be coupled to bus 22. For example, in this embodiment, circuitry 210 may comprise PCI-X bus interface circuitry 212 and PCI Express™ bus interface circuitry 214. That is, as discussed below, depending, at least in part, upon the bus protocol with which bus 22 may comply or be compatible, a particular operating mode of integrated circuit 40 may be selected in which only a single appropriate one of the respective interface circuitry in circuitry 210 may be enabled to exchange data and/or commands with devices that may be coupled to bus 22, other respective interface circuitry in circuitry 210 may be disabled.

Although not shown in the Figures, in this embodiment, memory control circuitry 232 and/or DMA circuitry 234 may be coupled to bus 254. In this embodiment, memory control circuitry 232 may comprise direct memory access (DMA) circuitry 234. Memory control circuitry 232 may control storage of data in, and retrieval of data from memory 228. For example, in this embodiment, memory control circuitry 232 may exchange commands and/or data with, for example, processor circuitry 202, interface circuitry 204, interface circuitry 210 and/or memory control circuitry 230. Based, at least in part, upon these commands, memory control circuitry 232 may exchange data and/or commands with memory 228. This may result in memory 228 storing and/or retrieving data in accordance with the commands and/or data supplied to memory controller circuitry 232. Additionally, depending upon the selected mode of operation of integrated circuit 40, DMA circuitry 234 may control, based upon commands and/or data received by circuitry 234 from other circuitry in integrated circuit 40, the exchange among I/O interface 204 and the other circuitry in integrated circuit 40 of data and/or commands received or intended to be transmitted by I/O interface circuitry 204 via one or more links 44. Without departing from this embodiment, DMA circuitry 234 may not be comprised in circuitry 232, but instead, may comprise circuitry that is distinct from circuitry 232, and is coupled to circuitry 232 and bus 254.

In this embodiment, memory control circuitry 230 may comprise RAID operation-related circuitry 240. Circuitry 240 may comprise, for example, DMA circuitry 238 and RAID calculation circuitry 236. Memory control circuitry 230 may control storage of data in, and retrieval of data from external memory 38. For example, in this embodiment, memory control circuitry 230 may exchange commands and/or data with, for example, processor circuitry 202, interface circuitry 210 and/or memory control circuitry 232. Based, at least in part, upon these commands, memory control circuitry 230 may exchange data and/or commands with memory 38. This may result in memory 38 storing and/or retrieving data in accordance with the commands and/or data supplied to memory controller circuitry 232. Additionally, depending upon the selected mode of operation of integrated circuit 40, DMA circuitry 238 may control, based upon commands and/or data received by circuitry 238 from other circuitry in integrated circuit 40, the exchange of RAID-related data among such other circuitry in integrated circuit 40. As used herein, "RAID-related data" means data involved in, generated as a result of, used as input or operands in, and/or used in carrying out and/or to facilitate operations involved in implementing and/or maintaining a RAID, such as, for example, RAID 29. RAID calculation circuitry 236 may comprise arithmetic accelerator circuitry (not shown) that may be capable of performing one or more arithmetic and/or logical operations using and/or involving RAID-related data, such as, for example, logical exclusive-or operations that may generate RAID parity data from initial user data and/or regenerate the initial user data from such RAID parity data. Without departing from this embodiment, DMA circuitry 238 and/or RAID calculation circuitry 236 may not be comprised in circuitry 230, but instead, may comprise circuitry that is distinct from circuitry 230, and is coupled to circuitry 230 and bus 254. Also without departing from this embodiment, integrated circuit 40 may not comprise RAID calculation circuitry 236, but alternatively, the arithmetic and/or logical operations performed by circuitry 236 instead may be performed by processor core 216.

Figure 3:
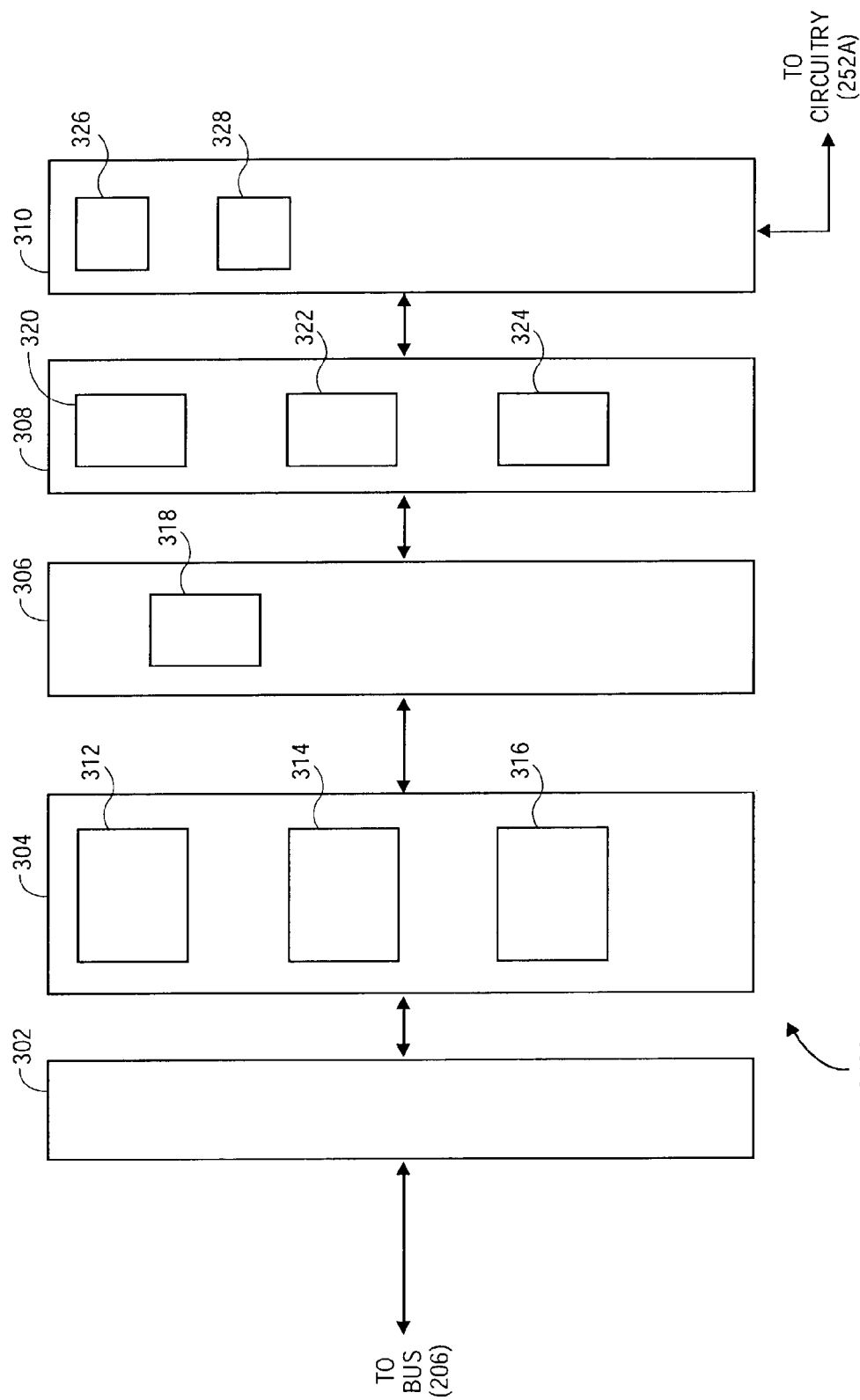
FIG. 3 is a diagram illustrating in greater detail interface circuitry in the integrated circuit of FIG. 2.

As stated previously, the respective construction of each of the protocol engines 250A, 250B, . . . 250N may be identical. FIG. 3 is a diagram that illustrates protocol engine 250A. Protocol engine 250A may comprise interface circuitry 302, data transport layer circuitry 304, port layer circuitry 306, data link layer circuitry 308, and SAS link layer circuitry 310. Although not shown in the Figures, circuitry 302 may couple circuitry 304, 306, 308, and 310 to bus 206 so as to permit circuitry 304, 306, 308, and/or 310 to exchange data and/or commands with processor core 218. SAS link layer circuitry 310 may be coupled to, and exchange data and/or commands with physical interface circuitry 252A. Transport layer circuitry 304 may be coupled to, and exchange data and/or commands with port layer circuitry 306. Port layer circuitry 306 also may be coupled to, and exchange data and/or commands with data link layer circuitry 308. SAS link layer circuitry 310 may be coupled to, and exchange data and/or commands with data link layer circuitry 308 and port layer circuitry 306.

In this embodiment, transport layer circuitry 304 may comprise Serial Management Protocol (SMP) transport layer circuitry 312, Serial Advanced Technology Attachment (ATA) Tunneled Protocol (STP) transport layer circuitry 314, and Serial Small Computer System Interface (SCSI) Protocol (SSP) transport layer circuitry 316. Also in this embodiment, port layer circuitry 306 may comprise connection management circuitry 318. Additionally in this embodiment, data link layer circuitry 308 may comprise SMP link layer circuitry 320, STP link layer circuitry 322, and SSP link layer 324 circuitry. In this embodiment, SAS link layer circuitry 310 may comprise out-of-band (OOB) signal management circuitry 326 and S-ATA link speed negotiation control circuitry 328.

Unless stated to the contrary herein, it should be understood that circuitry 304, 306, 308, and 310 may implement conventional SAS communication processes, procedures, and techniques. For example, unless stated to the contrary herein, it should be understood that circuitry 312, 314, and 316 may implement conventional SMP transport layer, STP transport layer, and SSP transport layer protocols, procedures, processes, and techniques, respectively, and also may generate respective sets of signals that may result in the carrying out of such protocols, procedures, processes, and techniques. Also, for example, circuitry 306 may implement conventional SAS port control protocols, procedures, processes, and techniques, and also may generate respective signals that may result in the carrying out of such protocols, procedures, processes, and techniques. Furthermore, for example, circuitry 320, 322, and 324 may implement conventional SMP link layer, STP link layer, and SSP link layer protocols, procedures, processes, and techniques, respectively, and also may generate respective sets of signals that may result in the carrying out of such protocols, procedures, processes, and techniques. Additionally, for example, circuitry 310 may implement conventional SAS data link protocols, procedures, processes, and techniques to control, e.g., physical interface 252A, and also may generate respective sets of signals that may result in the carrying out of such protocols, procedures, processes, and techniques. Of course, depending upon the particular protocols via which integrated circuit 40 may be capable of communicating, many variations, modifications, and alternatives are possible without departing from this embodiment.

In this embodiment, each physical layer interface circuitry 252A, 252B, . . . 252N may comprise respective analog front end (AFE) circuitry 253A, 253B, . . . 253N that may receive and/or transmit data and/or control signals to and/or from mass storage 28 via respective links 44. In this embodiment, physical layer interface circuitry 252A may comprise AFE circuitry 253A that may receive and/or transmit data and/or control signals to and/or from one or more external mass storage devices comprised in one or more devices 52 via one of the links 44.

As stated previously, one or more devices 52 may be comprised in a protocol domain 50. In this embodiment, protocol domain 50 may be either an SAS domain or an S-ATA domain. If protocol domain 50 is an SAS domain, then one or more devices 52 may be capable of communicating using an SAS protocol via one of the links 44. Conversely, if protocol domain 50 is an S-ATA domain, then one or more devices 52 may be capable of communicating using an S-ATA protocol via one of the links 44.

As is discussed below, in this embodiment, depending at least in part upon the selected mode of operation of integrated circuit 40, integrated circuit 40 may be capable of discovering, at least in part, whether one or more devices 52 are capable of communicating via an SAS communication protocol or via an S-ATA communication protocol. Based upon this discovery, at least in part, by integrated circuit 40, integrated circuit 40 may select, at least in part, whether to communicate with one or more devices 52 using either an SAS or an S-ATA communication protocol, in order to enable integrated circuit 40 to communicate with one or more devices 52.

For example, in accordance with SAS and S-ATA protocols, during communication link initialization between integrated circuit 40 and mass storage 28, following, e.g., a reset of system 100, OOB signal sequences may be exchanged between AFE circuitry 253A and one or more mass devices 52 via one of the links 44. In accordance with S-ATA protocol, if one or more devices 52 are capable of communicating using S-ATA protocol and are directly coupled to AFE circuitry 253A via one of the links 44 (i.e., if one or more devices 52 are not coupled to AFE circuitry 253A via an SAS expander), one or more devices 52 may be expected to transmit to AFE circuitry 253A during an S-ATA OOB signal sequence predetermined, special primitive signal sequence (referred to in FIG. 1 by the block referenced by numeral 54) that may comprise, e.g., a predetermined comma character, such as, a K28.5 character. As used herein, a "signal sequence" comprises one or more signals. Conversely, in accordance with SAS protocol, if one or more devices 52 are capable of communicating using SAS protocol, one or more devices 52 may be expected not to transmit to AFE circuitry 253A this predetermined, special signal sequence 54 during an SAS OOB signal sequence, but instead may be expected to transmit to AFE circuitry 253A during this signal sequence a predetermined COMSAS signal sequence 56. Thus, if, during such an OOB signal sequence, AFE circuitry 253A receives from one or more devices 52 signal sequence 54, but does not receive COMSAS signal sequence 56, this may indicate that protocol domain 50 is an S-ATA domain, one or more devices 52 are directly coupled to AFE circuitry 253A via one of the links 44, and one or more devices 52 are capable of communicating with integrated circuit 40 via an S-ATA protocol. Conversely, if, during such an OOB signal sequence, AFE circuitry 253A receives from one or more devices 52 COMSAS signal sequence 56, but does not receive signal sequence 54, this may indicate that protocol domain 50 is an SAS domain and one or more devices 52 are capable of communicating with integrated circuit via an SAS protocol.

In accordance with this embodiment, during communication link initialization, physical interface circuitry 252A may provide to OOB management circuitry 320 signals indicative of OOB signals received by AFE circuitry 253A from one or more devices 52. OOB management circuitry 320 may examine the signals provided to it from interface circuitry 252A to detect whether AFE circuitry 253A has received, during an OOB signal sequence, from one or more devices 52, signal sequence 54 or COMSAS signal sequence 56. After OOB management circuitry 320 detects that AFE circuitry 253A has received, during an OOB signal sequence, signal sequence 54 or COMSAS signal sequence 56, OOB management circuitry 320 may provide one or more signals to processor core 218 that may indicate whether AFE circuitry 253A has received signal sequence 54 or COMSAS signal sequence 56.

After completion of this OOB signal sequence, processor core 218 may determine, based at least in part upon whether OOB management circuitry 320 detected that AFE circuitry 253A received, or failed to receive, during the OOB signal sequence, signal sequence 54 and/or COMSAS signal sequence 56, whether one or more devices 52 are directly coupled to integrated circuit 40 via one of the links 44 and are capable of communicating with integrated circuit 40 via an S-ATA protocol, or one or more devices 52 are capable of communicating with integrated circuit 40 via an SAS protocol. For example, if circuitry 320 detected that AFE circuitry 253A received, during this OOB signal sequence, from one or more devices 52 signal sequence 54, but did not receive COMSAS signal sequence 56, processor core 218 may determine that one or more devices 52 are directly coupled to AFE circuitry 253A via one of the links 44 and are capable of communicating with integrated circuit 40 via an S-ATA protocol. Conversely, if circuitry 320 detected that AFE circuitry 253A received, during this OOB signal sequence, from one or more devices 52 COMSAS signal sequence 56, but did not receive signal sequence 54, processor core 218 may determine that one or more devices 52 are capable of communicating with integrated circuit 40 via an SAS protocol.

Of course, depending upon the particular communication protocols via which integrated circuit 40 may be capable of communicating, character 54 and/or signal 56 may vary without departing from this embodiment. Additionally, depending upon the particular communication protocols via which integrated circuit 40 and/or one or more devices 52 may be capable of communicating, the manner in which integrated circuit 40 may determine the communication protocol or protocols via which one or more devices 52 may be capable of communicating may vary without departing from this embodiment.

If processor core 218 determines that one or more devices 52 are directly coupled to AFE circuitry 253A via one of the links 44 and are capable of communicating with integrated circuit 40 via an S-ATA protocol, processor core 218 may issue one or more respective signals to circuitry 304, 306, 308, 310, and 252A. This may result in circuitry 250A and 252A being enabled to permit integrated circuit 40 to communicate directly with one or more devices 52, using S-ATA protocol, via one of the links 44. More specifically, this may result in, for example, the disabling of circuitry 312, 316, 318, 320, and 324 from being involved in communications between integrated circuit 40 and one or more devices 52, and may also result in the enabling of circuitry 314, 322, and 328 to be actively involved in carrying out communications between integrated circuit 40 and one or more devices 52. Alternatively, in response, at least in part, to the signaling of circuitry 310 by processor core 218, circuitry 310 may signal circuitry 306 and/or circuitry 318; this may result in the disabling of circuitry 318 from being involved in communications between integrated circuit 40 and one or more devices 52.

The signaling of circuitry 252A by processor core 218 may result, at least in part, in the transmission and/or reception signaling levels of AFE circuitry 253A being set so as to be in compliance or compatible with S-ATA signal transmission and/or reception signaling levels. That is, this may result in AFE circuitry 253A adjusting the voltage and/or current levels of signals transmitted to one or more devices 52 by AFE circuitry 253A to be in compliance or compatible with S-ATA transmission signal voltage and/or current levels, and/or may also result in AFE circuitry 253A detecting signals received by AFE circuitry 253A whose voltage and/or current levels are in compliance or compatible with S-ATA received signal voltage and/or current levels.

The signaling of circuitry 310 by processor core 218 may result in the enabling of circuitry 328 to implement conventional S-ATA communication link speed negotiation protocols, procedures, processes, and techniques to negotiate with one or more devices 52 the appropriate speed of communication to be carried out, via one of the links 44, between one or more devices 52 and integrated circuit 40. Circuitry 310 may generate and transmit to interface 252A one or more signals that may result in the carrying out of such protocols, procedures, processes, and techniques.

In operation of system 100, when circuitry 318 is enabled to be actively involved in carrying out communications between integrated circuit 40 and one or more devices 52, circuitry 318 may implement, at least in part, connection management functions that may prevent, at least in part, timing-out of the communications between integrated circuit 40 and one or more devices 52. Conversely, in operation of system 100, when circuitry 318 is disabled from being actively involved in carrying out such communications, processor core 218 may provide one or more signals to circuitry 250A that may result in circuitry 250A emulating S-ATA host functionality that may result in the maintaining, without timing-out, of such communications.

Conversely, if processor core 218 determines that one or more devices 52 are capable of communicating with integrated circuit 40 via an SAS protocol, processor core 218 may issue one or more respective signals to circuitry 304, 306, 308, 310, and 252A. This may result in circuitry 250A and 252A being enabled to permit integrated circuit 40 to communicate with one or more devices 52, using an SAS protocol, via one of the links 44. More specifically, the signaling of circuitry 304, circuitry 306, and circuitry 308 may result in the disabling of circuitry 314 from being actively involved in communications between integrated circuit 40 and one or more devices 52, the enabling of circuitry 318 to be actively involved in such communications, and the disabling of circuitry 322 from being involved in such communications, respectively. Additionally, depending upon whether communications are carried out between one or more devices 52 and integrated circuit 40 via an SMP or SSP SAS protocol, the signaling of circuitry 304 by processor core 218 may result in the enabling of circuitry 312 or 316, respectively, to be actively involved in such communications, and the signaling of circuitry 308 by processor core 218 may result in the enabling of circuitry 320 or 324, respectively, to be involved in such communications. Additionally, the signaling of circuitry 252A by processor core 218 may result, at least in part, in the transmission and/or reception signaling levels of AFE circuitry 253A being set so as to be in compliance or compatible with SAS signal transmission and/or reception signaling levels. That is, this may result in AFE circuitry 253A adjusting the voltage and/or current levels of signals transmitted to one or more devices 52 by AFE circuitry 253A to be in compliance or compatible with SAS transmission signal voltage and/or current levels, and/or may also result in AFE circuitry 253A detecting signals received by AFE circuitry 253A whose voltage and/or current levels are in compliance or compatible with SAS received signal voltage and/or current levels. Furthermore, the signaling of circuitry 310 by processor core 218 may result in the disabling of circuitry 328 from implementing conventional S-ATA communication link speed negotiation protocols, procedures, processes, and techniques described previously.

In this embodiment, a mode of operation of integrated circuit 40 may be selected, based upon and/or as a result of, at least in part, of one or more signals provided to GPIO interface circuitry 248 from selector circuitry 42, one or more signals provided to host bus interface circuitry 210 by host processor 12, and/or execution by processor circuitry 202 of one or more program instructions stored in memory 39. Depending, at least in part, upon the selected mode of operation of integrated circuit 40, integrated circuit 40 may operate in accordance with one or more operational characteristics that may correspond to the selected mode of operation. For example, depending, at least in part upon the selected mode of operation of integrated circuit 40, these operational characteristics may include which of bus interfaces 212 and 214 is enabled to or disabled from communicating with bus 22, and/or which protocol engines 250A, 250B, . . . 250N are enabled to or disabled from communicating with mass storage 28. Additionally or alternatively, such operational characteristics may comprise, for example, whether one or more of the communication protocols that are implemented by one or more of the protocol engines 250A, 250B, . . . 250N are selected based at least in part upon the discovery of one or more communication protocols via which one or more devices (such as, for example, one or more devices 52) in mass storage 28 may communicate, or whether communication between integrated circuit and such devices is to be carried out via one or more predetermined protocols. Also additionally or alternatively, such operational characteristics may comprise whether DMA circuitry 234 is enabled to control or disabled from controlling the exchange among I/O interface 204 and the other circuitry in integrated circuit 40 of data and/or commands received or intended to be transmitted by I/O interface circuitry 204 via one or more links 44. Such operational characteristics may also include, for example, whether processor core 216 and/or RAID operation-related circuitry 240 are enable to perform or disabled from performing one or more operations involved in implementing and/or maintaining a RAID, such as, for example, RAID 29. Examples of such operations that may be involved in implementing and/or maintain a RAID are disclosed in, e.g., co-pending U.S. patent application Ser. No. 10/301,028, entitled "Integrated Circuit Having Multiple Modes Of Operation," filed on Nov. 20, 2002. Of course, many modifications, variations, and alternatives are possible without departing from this embodiment.

In this embodiment, selector circuitry 42 may comprise one or more jumpers and/or one or more dual in-line package (DIP) switches 43 that may be set (e.g., by a not shown human operator) in a plurality of different configurations to select, at least in part, the selected operating mode of integrated circuit 40. That is, the plurality of different configurations of the jumper and/or switches 43 may correspond to one or more different operating characteristics of one or more different operating modes of integrated circuit 40. When the one or more jumpers and/or one or more DIP switches 43 are set in a particular configuration, the selector circuitry 42 may generate one or more control signals that may correspond to one or more different operating characteristics of integrated circuit 40 selected by that particular configuration. After, for example, a reset of integrated circuit 40, these one or more control signals may be supplied to processor cores 216 and 218. In response, processor core 216 may be enabled or disabled in accordance with the selected mode of operation; additionally, processor core 218 may operate in accordance with and/or generate and supply appropriate control signals to interface circuitry 204, 210, 232, and/or 236 that may result in such circuitry operating in accordance with the selected mode of operation. Alternatively or additionally, the one or more control signals from selector circuitry 42 also may be supplied to circuitry 210, circuitry 234, and/or circuitry 240. This may result in enabling or disabling of bus interface circuitry 212, bus interface circuitry 214, circuitry 240, and/or circuitry 234 in accordance with the mode of operation of integrated circuit 40 that corresponds to and/or is indicated by the one or more control signals.

Alternatively or additionally, in this embodiment, the selected mode of operation of integrated circuit 40 may be selected based upon and/or as a result, at least in part, of one or more signals indicative of the selected mode of operation that may be provided to host bus interface circuitry 210 by host processor 12. In response to these one or more signals, processor core 216 may be enabled or disabled in accordance with the selected mode of operation; additionally, processor core 218 may operate in accordance with and/or generate and supply appropriate control signals to interface circuitry 204, 210, 232, and/or 236 that may result in such circuitry operating in accordance with the selected mode of operation.

Also alternatively or additionally, in this embodiment, the selected mode of operation of integrated circuit 40 may be selected based upon and/or as a result, at least in part, of execution by processor circuitry 202 of one or more program instructions stored in memory 39, memory 220, and/or memory 224. That is, according to this embodiment, different respective operating modes of integrated circuit 40 may be associated with different respective firmware program instruction set images that when executed, at least in part, by processor core 216 and processor core 218 may result in the respective operating modes being associated with these respective images being selected, and also may result in integrated circuit 40 operating in the respective operating modes. In this embodiment, only a single such firmware program instruction set image may be stored in memory 39, memory 220, and/or memory 224. This single firmware program instruction set image may comprise one or more firmware program instructions that may be executed by processor cores 216 and processor 218 after, for example, a reset of integrated circuit 40. This may result in processor core 216 being enabled or disabled in accordance with the selected mode of operation. This may also result in processor core 218 operating in accordance with and/or generating and supplying appropriate control signals to interface circuitry 204, 210, 232, and/or 236 that may result in such circuitry operating in accordance with the selected mode of operation.

Figure 4:
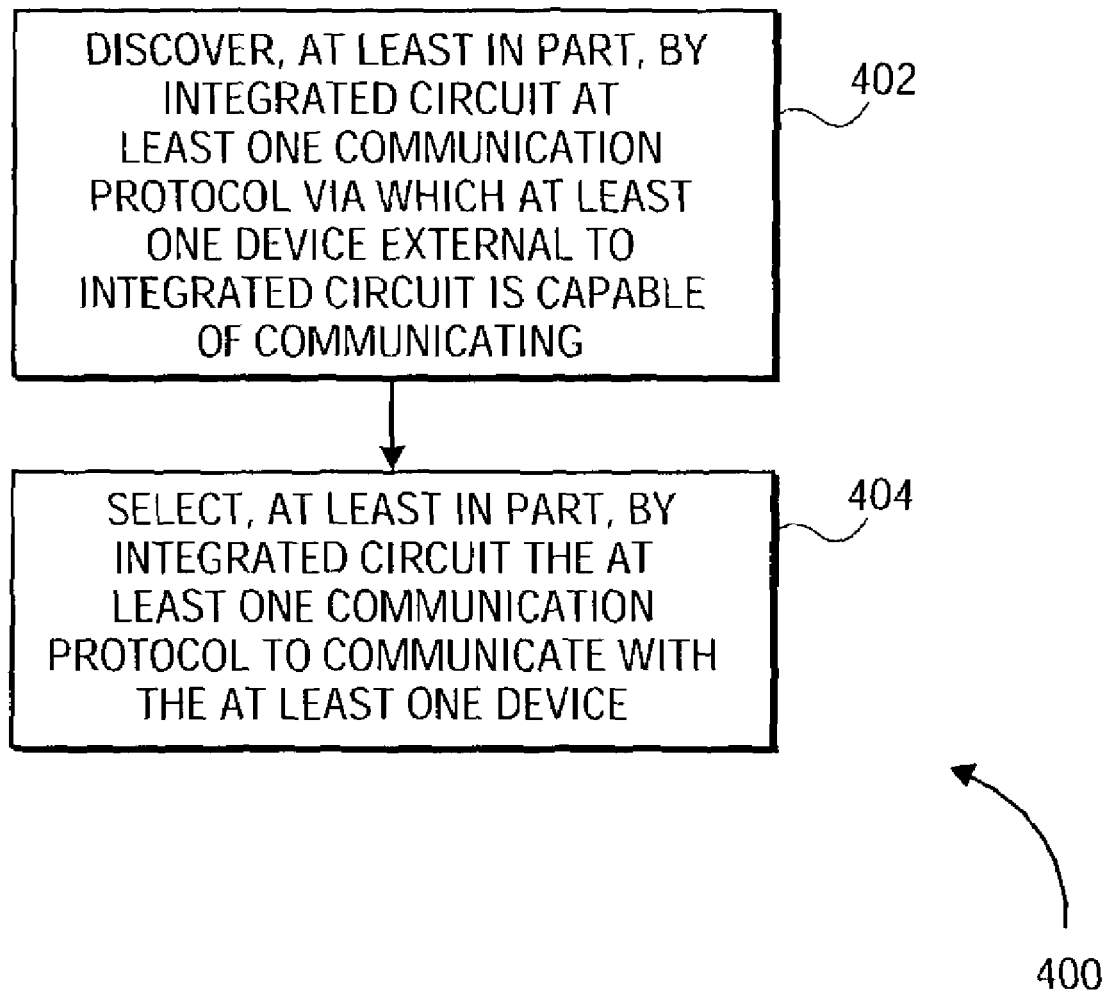
FIG. 4 is a flowchart illustrating operations that may be performed according to an embodiment.

Memory 39, memory 220, and/or memory 224 may comprise program instructions that, when executed by integrated circuit 40, may result in, among other things, integrated circuit 40 performing operations in accordance with one embodiment. FIG. 4 is a flowchart that illustrates these and other operations 400 that may be carried out in system 100, in accordance with one embodiment. In this embodiment, operations 400 may be carried out in system 100 after an operating mode of integrated circuit 40 has been selected in which one or more of the communication protocols that are implemented by one or more of the protocol engines 250A, 250B, . . . 250N (e.g., protocol engine 250A) are selected based at least in part upon the discovery of one or more communication protocols via which one or more devices (such as, for example, one or more devices 52) in mass storage 28 may communicate.

Operations 400 may commence with the discovery, at least in part, by integrated circuit 40, of at least one communication protocol via which at least one device external to integrated circuit 40 (e.g., one or more devices 52) may be capable of communicating, as illustrated by operation 402 in FIG. 4. In this embodiment, the discovery, at least in part, by integrated circuit 40 of the at least one communication protocol via which at least one device external to integrated circuit 40 may communicate, as a result of operation 402, may be based, at least in part, upon a determination by processor core 218, in the manner described previously, of whether OOB management circuitry 320 detected that AFE circuitry 253A received, or failed to receive, during the OOB signal sequence, signal sequence 54 and/or COMSAS signal sequence 56. For example, as stated previously, if circuitry 320 detected that AFE circuitry 253A received, during this OOB signal sequence, from one or more devices 52 signal sequence 54, but did not receive COMSAS signal sequence 56, processor core 218 may determine that one or more devices 52 are directly coupled to AFE circuitry 253A via one of the links 44 and are capable of communicating with integrated circuit 40 via an S-ATA protocol; as a result, at least in part, of this determination by processor core 218, integrated circuit may discovery at least in part, as a result of operation 402, that one or more devices 52 are capable of communicating via an S-ATA protocol. Conversely, if circuitry 320 detected that AFE circuitry 253A received, during this OOB signal sequence, from one or more devices 52 COMSAS signal sequence 56, but did not receive signal sequence 54, processor core 218 may determine that one or more devices 52 are capable of communicating with integrated circuit 40 via an SAS protocol; as a result, at least in part, of this determination by processor core 218, integrated circuit may discovery at least in part, as a result of operation 402, that one or more devices 52 are capable of communicating via an SAS protocol.

Thereafter, integrated circuit 40 may select, at least in part, the at least one communication protocol to use to communicate with the at least one device, as illustrated by operation 404 in FIG. 4. For example, in this embodiment, after discovering, as a result of operation 402, the at least one protocol via which one or more devices 52 may communicate, processor core 218 may issue one or more respective signals to circuitry 304, 306, 308, 310, and 252A. If, as a result of operation 402, integrated circuit 40 discovered that one or more devices 52 may be capable of communicating via an S-ATA protocol, this may result in circuitry 250A and 252A being enabled to permit integrated circuit 40 to communicate directly with one or more devices 52 using an S-ATA protocol, via one of the links 44. Conversely, if, as a result of operation 402, integrated circuit 40 discovered that one or more devices 52 may be capable of communicating via an SAS protocol, this may result in circuitry 250A and 252A being enabled to permit integrated circuit 40 to communicate with one or more devices 52 using an SAS protocol.

Thus, in summary, one system embodiment may comprise a circuit card including an integrated circuit. The circuit card may be capable of being coupled to a bus. The integrated circuit may be capable of discovering, at least in part, at least one communication protocol via which at least one device external to the integrated circuit is capable of communicating. The integrated circuit also may be capable of communicating in accordance with a plurality of different communication protocols. The integrated circuit further may be capable of selecting, at least in part, the at least one communication protocol to use to communicate with the at least one device.

One apparatus embodiment may include an integrated circuit that is capable of discovering, at least in part, at least one communication protocol via which at least one device external to the integrated circuit is capable of communicating. The integrated circuit also may be capable of communicating in accordance with a plurality of different communication protocols. The integrated circuit further may be capable of selecting, at least in part, the at least one communication protocol to use to communicate with the at least one device.

Advantageously, the integrated circuit of these embodiments may offer enhanced communication capabilities, and may communicate using a plurality of communication protocols. Also advantageously, the communication protocol or protocols used by this integrated circuit may be selected, at least in part by the integrated circuit, based at least in part, upon the discovery by the integrated circuit, at least in part, of the one or more communication protocols via which one or more external devices are capable of communicating. Further advantageously, this may permit a single integrated circuit according to these embodiments to communicate with a data storage system directly using a plurality of different communication protocols. Thus, for example, it may be possible to use the integrated circuit of these embodiments to communicate directly via one or more communication links with one or more devices in SAS and/or S-ATA protocol domains in the data storage system, without having to employ one or more external communication protocol converters, translators, and/or expanders (such as, for example, one or more SAS expanders) coupled between the integrated circuit and the data storage system, although such protocol converters, translators, and/or expanders may be used without departing from these embodiments. Advantageously, these features may permit the integrated circuit of these embodiments to exhibit enhanced versatility and utility compared to the prior art, and may reduce design costs of employing this integrated circuit compared to the prior art.

Also advantageously, for purposes of considering at least some of the functionality of one or more embodiments, circuitry 302 and the circuitry in integrated circuit 40 that is external to circuitry 250A may together be viewed, at least in part, in conceptual, behavioral, and/or functional sense, as comprising, at least in part, a single control element to control which communication protocol may be used by the integrated circuit 40 to communicate with the at least one device. Thus, advantageously, in at least these one or more embodiments, this control element may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Also alternatively, circuitry 204 may comprise protocol engine circuitry that may permit integrated circuit 40 to be able to communicate with mass storage 28 using a Fibre Channel protocol that complies or is compatible with the interface/protocol described in ANSI Standard Fibre Channel (FC) Physical and Signaling Interface-3 X3.303:1998 Specification. Other modifications, variations, and alternatives are also possible. Accordingly, the claims are intended to cover all such equivalents.

What is claimed is:

1. A method comprising:
discovering, with processor circuitry of a single integrated circuit chip, at least one communication protocol, via which at least one device external to the single integrated circuit chip is capable of communicating, based on receiving or failing to receive a predetermined signal sequence from the at least one device, the single integrated circuit chip being capable of communicating in accordance with a plurality of different communication protocols; and
selecting, by the single integrated circuit chip, the at least one communication protocol to use to communicate with the at least one device.

2. The method of claim 1, wherein:
the receipt of the predetermined signal sequence being indicative of a first protocol domain that comprises the at least one device.

3. The method of claim 2, wherein:
the failure to receive at the single integrated circuit chip, during a communication link initialization, a predetermined out-of-band signal sequence from the at least one device being indicative of a second protocol domain comprising the at least one device.

4. The method of claim 2, wherein:
the predetermined signal sequence comprises a predetermined comma character.

5. The method of claim 1, wherein:
the single integrated circuit chip comprises protocol engine circuitry; and
the selecting comprises issuing from the processor circuitry to the protocol engine circuitry one or more signals that enable, the protocol engine circuitry to communicate using the at least one communication protocol.

6. The method of claim 5, wherein:
the single integrated circuit chip also comprises physical interface circuitry; and
the selecting also comprises issuing to the physical interface circuitry from the processor circuitry one or more other signals that select, one or more physical signaling levels at which physical interface circuitry is capable of issuing one or more signals, the one or more physical signaling levels being in accordance with the at least one communication protocol.

7. The method of claim 6, wherein:
the plurality of different communication protocols comprise a Serial Advanced Technology Attachment protocol and Serial Attached Small Computer System Interface protocol.

8. An apparatus comprising:
a single integrated circuit chip including processor circuitry that is capable of discovering with the processor circuitry, at least one communication protocol, via which at least one device external to the single integrated circuit chip is capable of communicating, based on receiving or failing to receive a predetermined signal sequence from the at least one device, the single integrated circuit chip also being capable of communicating in accordance with a plurality of different communication protocols, the single integrated circuit chip further being capable of selecting, the at least one communication protocol to use to communicate with the at least one device.

9. The apparatus of claim 8, wherein:
the predetermined signal sequence is indicative of a first protocol domain that comprises the at least one device.

10. The apparatus of claim 9, wherein
a failure to receive at the single integrated circuit chip, during a communication link initialization, a predetermined out-of-band signal sequence from the at least one device is indicative of a second protocol domain comprising the at least one device.

11. The apparatus of claim 9, wherein:
the predetermined signal sequence comprises a predetermined comma character.

12. The apparatus of claim 8, wherein:
the single integrated circuit chip comprises protocol engine circuitry; and
the processor circuitry is capable of issuing to the protocol engine circuitry one or more signals that enable, the protocol engine circuitry to communicate using the at least one communication protocol.

13. The apparatus of claim 12, wherein:
the single integrated circuit chip also comprises physical interface circuitry; and
the processor circuitry is also capable of issuing to the physical interface circuitry from the processor circuitry one or more other signals that select, one or more physical signaling levels at which the physical interface circuitry is capable of issuing one or more signals, the one or more physical signaling levels being in accordance with the at least one communication protocol.

14. The apparatus of claim 13, wherein:
the plurality of different communication protocols comprise a Serial advanced Technology Attachment.protocol and Serial Attached Small Computer System Interface protocol.

15. An article comprising:
a storage medium having stored thereon instructions that when executed by a machine result in the following:
discovering, with processor circuitry of a single integrated circuit chip, at least one communication protocol, via which at least one device external to the single integrated circuit chip is capable of communicating, based on receiving or failing to receive a predetermined signal sequence from the at least one device, the single integrated circuit chip being capable of communicating in accordance with a plurality of different communication protocols; and selecting, by the single integrated circuit chip of the at least one communication protocol to use to communicate with the at least one device.

16. The article of claim 15, wherein:
the receipt of the predetermined signal sequence being indicative of a first protocol domain that comprises the at least one device.

17. The article of claim 16, wherein:
the failure to receive at the single integrated circuit chip, during a communication link initialization, a predetermined out-of-band signal sequence from the at least one device being indicative of a second protocol domain comprising the at least one device.

18. The article of claim 16, wherein:
the predetermined signal sequence comprises a predetermined comma character.

19. The article of claim 15, wherein:
the single integrated circuit chip comprises protocol engine circuitry; and
the selecting comprises issuing from the processor circuitry to the protocol engine circuitry one or more signals that enable, the protocol engine circuitry to communicate using the at least one communication protocol.

20. The article of claim 19, wherein
the single integrated circuit chip also comprises physical interface circuitry, and the selecting also comprises issuing to the physical interface circuitry from the processor circuitry one or more other signals that select, one or more physical signaling levels at which the physical interface circuitry is capable of issuing one or more signals, the one or more physical signaling levels being in accordance with the at least one communication protocol.

21. The article of claim 20, wherein:
the plurality of different communication protocols comprise a Serial Advanced Technology Attachment protocol and Serial Attached Small Computer System Interface protocol.

22. A system comprising:
a circuit card including a single integrated circuit chip, the circuit card being capable of being coupled to a bus, the single integrated circuit chip including processor circuitry that is capable of discovering with the processor circuitry, at least one communication protocol, via which at least one device external to the single integrated circuit chip is capable of communicating, based on receiving or failing to receive a predetermined signal sequence from the at least one device, the single integrated circuit chip also being capable of communicating in accordance with a plurality of different communication protocols, the single integrated circuit chip further being capable of selecting the at least one communication protocol to use to communicate with the at least one device.

23. The system of claim 22, further comprising:
a circuit board comprising the bus and a bus interface slot, the circuit card being capable of being coupled to the bus interface slot.

24. The system of claim 22, wherein:
the at least one device comprises at least one of one or more mass storage devices and one or more peripheral devices.

25. The system of claim 24, wherein:
the one or more mass storage devices comprises a redundant array of independent disks (RAID).

26. The system of claim 22, wherein
the single integrated circuit chip is capable of discovering the at least one communication protocol based at least in part upon one or more of the following:
detection by the single integrated circuit chip of a predetermined signal sequence from the at least one device; and
failure to detect at the single integrated circuit chip, during initialization of a communication link between the single integrated circuit chip and the at least one device, of a COMSAS signal sequence from the at least one device.

27. The system of claim 26, wherein:
the predetermined signal sequence comprises a K28.5 character.

28. The system of claim 22, wherein:
the single integrated circuit chip is directly connected, via a communication link, to the at least one device.

29. The system of claim 28, wherein:
the at least one communication protocol is one of a Serial Advanced Technology Attachment protocol and Serial Attached Small Computer System Interface protocol.

* * * * *